United States Patent
Tashiro et al.

(10) Patent No.: US 8,035,784 B2
(45) Date of Patent: Oct. 11, 2011

(54) SEMI-TRANSMISSIVE LIQUID CRYSTAL DISPLAY DEVICE AND MANUFACTURING METHOD OF THE SAME

(75) Inventors: Kunihiro Tashiro, Kawasaki (JP); Yasutoshi Tasaka, Kawasaki (JP); Hidefumi Yoshida, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 915 days.

(21) Appl. No.: 11/046,095

(22) Filed: Jan. 28, 2005

(65) Prior Publication Data

US 2006/0061715 A1 Mar. 23, 2006

(30) Foreign Application Priority Data

Sep. 22, 2004 (JP) ................................. 2004-274486

(51) Int. Cl.
G02F 1/1337 (2006.01)
G02F 1/1335 (2006.01)

(52) U.S. Cl. ......... 349/129; 349/114; 349/123; 349/130

(58) Field of Classification Search ................... 349/114, 349/123, 129–130
See application file for complete search history.

(56) References Cited

U.S. PATENT DOCUMENTS

| | | | |
|---|---|---|---|
| 6,281,952 B1 | 8/2001 | Okamoto et al. | |
| 6,437,844 B1 | 8/2002 | Hattori et al. | |
| 6,512,564 B1 * | 1/2003 | Yoshida et al. | 349/124 |
| 6,512,569 B1 * | 1/2003 | Acosta et al. | 349/181 |
| 6,771,334 B2 | 8/2004 | Kubota et al. | |
| 6,847,426 B2 * | 1/2005 | Fujimori et al. | 349/113 |
| 2002/0171792 A1 * | 11/2002 | Kubota et al. | 349/114 |
| 2004/0105053 A1 * | 6/2004 | Ozeki et al. | 349/112 |
| 2004/0145691 A1 * | 7/2004 | Kubota et al. | 349/114 |
| 2005/0030453 A1 * | 2/2005 | Maeda | 349/114 |
| 2008/0198307 A1 * | 8/2008 | Maeda et al. | 349/106 |

FOREIGN PATENT DOCUMENTS

| | | |
|---|---|---|
| JP | 10-197862 | 7/1998 |
| JP | 11-7018 | 1/1999 |
| JP | 11-133429 | 5/1999 |
| JP | 11-242226 | 9/1999 |
| JP | 2000-122099 | 4/2000 |
| JP | 2001-249339 | 9/2001 |
| JP | 2002-207227 | 7/2002 |

* cited by examiner

*Primary Examiner* — Nathanael R Briggs
(74) *Attorney, Agent, or Firm* — Greer, Burns & Crain, Ltd.

(57) ABSTRACT

A semi-transmissive liquid crystal display device is formed by sealing liquid crystal of negative dielectric anisotropy between a TFT substrate and a counter substrate, and has a transmission region controlling transmitted light and a reflection region controlling reflected light. Moreover, a reflecting electrode and a transparent electrode on the TFT substrate are covered with a first vertical orientation film, and a common electrode on the counter substrate is covered with a second vertical orientation film. Only the entire second vertical orientation film and the first vertical orientation film in the transmission region are modified by light, a pretilt angle of liquid crystal molecules on an interface between the first and second vertical orientation films is 45° or more, and the liquid crystal molecules in the transmission region are subjected to bend orientation.

12 Claims, 13 Drawing Sheets

SEMI-TRANSMISSIVE LIQUID CRYSTAL DISPLAY DEVICE AND MANUFACTURING METHOD OF THE SAME

CROSS-REFERENCE TO RELATED APLICATIONS

This application is based on and claims priority of Japanese Patent Application No. 2004-274486 filed on Sep. 22, 2004, the entire contents of which are incorporated herein by reference.

BACKGROUND OF THE INVENTION

1. Field of the Invention

The present invention relates to a semi-transmissive liquid crystal display device which displays images by using a backlight in a dark environment and by utilizing reflection of outside light in a bright environment, and to a method for manufacturing the same.

2. Description of the Prior Art

A liquid crystal display device has advantages in that the device is thin and light, and the device can be driven at low voltage and uses much less power. Thus, the liquid crystal display device is widely used in various electronic devices. Particularly, an active matrix liquid crystal display device, in which a TFT (thin film transistor) is provided as a switching element for each picture element, is as excellent as a CRT (cathode ray tube) in terms of display quality. Thus, the active matrix liquid crystal display device is widely used in a display of a television, a personal computer or the like.

A general liquid crystal display device has a structure in which liquid crystal is sealed between two substrates disposed so as to face each other. A TFT, a picture element electrode and the like are formed on one of the substrates, and a color filter, a common electrode and the like are formed on the other substrate. Hereinafter, the substrate on which the TFT, the picture element electrode and the like are formed will be called a TFT substrate, and the substrate disposed so as to face the TFT substrate will be called a counter substrate. Moreover, the structure including liquid crystal sealed between the TFT substrate and the counter substrate will be called a liquid crystal panel.

There are three types of liquid crystal display devices, including: a transmissive liquid crystal display device which uses a backlight as a light source and displays images by using light transmitted through a liquid crystal panel; a reflective liquid crystal display device which displays images by utilizing reflection of outside light (natural light or lamplight); and a semi-transmissive liquid crystal display device which displays images by using a backlight in a dark environment and by utilizing reflection of outside light in a bright environment.

In the semi-transmissive liquid crystal display device, a transmission region where an amount of transmitted light is controlled, and a reflection region where an amount of reflected light is controlled are usually provided in one picture element. In the transmission region, light passes through a liquid crystal layer only once. On the other hand, in the reflection region, light passes through the liquid crystal layer twice (back and forth). Thus, in order to effectively utilize both of the transmitted light and the reflected light, it is required to match phase difference conditions of the liquid crystal layer between the reflection region and the transmission region. The phase difference conditions of the liquid crystal layer are indicated by the product of a refractive index difference (a difference in refractive index between extraordinary light and normal light) Δn of the liquid crystal layer and a thickness d of the liquid crystal layer. In principle, a refractive index difference Δn of the liquid crystal layer or a thickness d of the liquid crystal layer in the reflection region is set at half a refractive index difference Δn of the liquid crystal layer or a thickness d of the liquid crystal layer in the transmission region. Accordingly, light emitted toward the face of the panel from the reflection region and light emitted toward the face of the panel from the transmission region can be set in the same polarization state. Thus, efficiency in use of light is maximized. As one utilizing such a technology, for example, Japanese Patent Laid-Open No. Hei 11 (1999)-242226 describes a semi-transmissive liquid crystal display device which has a thinner liquid crystal layer in a reflection region than that in a transmission region, and has orientation films oriented in different directions between the reflection region and the transmission region.

Incidentally, in the case of displaying moving images on a liquid crystal display device, if a response speed of liquid crystal is slower than write time (normally, about 17 ms) of a display signal, an afterimage phenomenon occurs since orientation of liquid crystal molecules cannot follow the display signal. In order to avoid the afterimage phenomenon, it is known that setting the liquid crystal orientation to an OCB (optically controlled birefringence) mode is effective. In the liquid crystal display device of the OCB mode, a birefringence index phase difference of a liquid crystal layer is controlled by switching the liquid crystal molecules in a bend orientation state. Since a switching speed in the bend orientation is sufficiently faster than a switching speed in twist orientation or splay orientation, the liquid crystal molecules follow the display signal to be oriented. Thus, the afterimage phenomenon is avoided.

The bend orientation is realized by disposing two substrates so as to face each other, the substrates being processed so as to have the same tilt direction of liquid crystal molecules on a liquid crystal interface. If a pretilt angle of the liquid crystal molecules in the vicinity of the interface of the liquid crystal layer is less than 45°, the liquid crystal molecules are more stable in terms of energy when the molecules are subjected to the splay orientation. Thus, it is required to shift the liquid crystal molecules from the splay orientation to the bend orientation by applying a bias voltage to the liquid crystal layer.

Japanese Patent Laid-Open No. Hei 11 (1999)-7018 describes a liquid crystal display device in which a high pretilt angle region is partially provided, which gives a pretilt angle larger than its surrounding by 100 or more to liquid crystal molecules. In this liquid crystal display device, a region subjected to the bend orientation in an initial state, or a region likely to be shifted from the splay orientation to the bend orientation is provided. Thus, shift to the bend orientation is allowed to easily occur.

Japanese Patent Laid-Open No. Hei 11 (1999)-133429 discloses a transmissive liquid crystal display device which gives a pretilt angle of a specific direction to liquid crystal on an interface of a substrate, by irradiating an ultraviolet ray 68 from the specific direction onto a surface of the substrate on which a vertical orientation film 69 is formed, as shown in schematic views of FIGS. 1A and 1B. In this transmissive liquid crystal display device, among alkyl chains 70 protruding in random directions from the vertical orientation film, the alkyl side chains 70 protruding in a direction parallel to an irradiation direction of the ultraviolet ray 68 are left. Accordingly, liquid crystal molecules are tilted to the direction.

FIG. 3 of Japanese Patent Laid-Open No. 2002-207227 discloses a semi-transmissive liquid crystal display device which has a liquid crystal layer set thinner in a reflection region than in a transmission region, drives liquid crystal in an OCB mode in which orientation is changed in the transmission region between splay orientation and bend orientation, and drives the liquid crystal in an R-OCB mode exhibiting hybrid orientation in the reflection region. In this semi-transmissive liquid crystal display device, the principal axis of liquid crystal molecules in the liquid crystal adjacent to an orientation film is processed to be parallel to a surface of the orientation film. Also in the case of using a vertical orientation film, the liquid crystal molecules on an interface of the orientation film are set to be approximately parallel to the surface of the orientation film by ultraviolet irradiation.

In the above-described liquid crystal display device of Japanese Patent Laid-Open No. Hei 11 (1999)-242226, the phase difference conditions in the transmission region and the reflection region are allowed to match by setting the liquid crystal layer in the reflection region to be thinner than that in the transmission region. However, there is no reference made to a panel configuration and a manufacturing method in the case where the OCB mode is used as the liquid crystal orientation. Thus, there is a drawback that response characteristics of the liquid crystal molecules are not sufficient, and an afterimage phenomenon occurs. Moreover, the orientation direction of the liquid crystal is significantly changed on the boundary between the transmission region and the reflection region. Thus, the orientation of the liquid crystal molecules in this portion becomes unstable. Consequently, there is a drawback that an effective aperture ratio is lowered.

The liquid crystal display device described in Japanese Patent Laid-Open No. Hei 11 (1999)-7018 is related to horizontal orientation. Thus, there is no reference made to the semi-transmissive liquid crystal display device of the OCB mode using vertical orientation. There are two methods to partially form a high pretilt angle region in a horizontal orientation region, including a method for partially forming a vertical orientation film after a horizontal orientation film is formed, and a method for using a mixed orientation film. However, in the former method, there is a problem that a process is complicated. In the latter method, there is a problem that an orientation film material is limited, and uniform film formation is difficult.

The transmissive liquid crystal display device described in Japanese Patent Laid-Open No. Hei 11 (1999)-133429 is related to the horizontal orientation. However, there is no reference made to the semi-transmissive liquid crystal display device. In the semi-transmissive liquid crystal display device, the liquid crystal layer has different optical path lengths between the reflection region and the transmission region. Thus, means for matching the phase difference conditions of the liquid crystal layer is required. Moreover, if the same pretilt angle is given by irradiating ultraviolet rays onto the reflection region and the transmission region, there arises a problem that optical compensation conditions in black display differ between the reflection region and the transmission region.

In the semi-transmissive liquid crystal display device described in Japanese Patent Laid-Open No. 2002-207227, the principal axis of the liquid crystal molecules in the liquid crystal adjacent to the orientation film is set to be parallel to the surface of the orientation film. Specifically, since the liquid crystal molecules on the interface of the orientation film are subjected to the horizontal orientation, it is difficult to form stable bend orientation. Moreover, in the case of using the vertical orientation film, the liquid crystal molecules on the interface of the orientation film are subjected to the horizontal orientation by the ultraviolet ray. Thus, there arises a similar problem. The stability of the bend orientation largely depends on a pretilt angle of the liquid crystal molecules. If the pretilt angle of the liquid crystal molecules is less than 45°, the splay orientation is likely to occur, and if the pretilt angle is 45° or more, the bend orientation is likely to occur. This is because stable orientation states in terms of energy are different depending on the pretilt angle.

SUMMARY OF THE INVENTION

Accordingly, it is an object of the present invention to provide a semi-transmissive liquid crystal display device which has a fast response speed and excellent display characteristics, and is capable of forming stable bend orientation and effectively utilizing transmitted light and reflected light. In addition, it is also an object of the present invention to provide a method for manufacturing the semi-transmissive liquid crystal display device.

The foregoing object is achieved by a semi-transmissive liquid crystal display device, which is formed by sealing liquid crystal of negative dielectric anisotropy between first and second substrates and has a transmission region controlling transmitted light and a reflection region controlling reflected light, characterized by including: a transparent electrode disposed in the transmission region of the first substrate; a reflecting electrode disposed in the reflection region of the first substrate; a first vertical orientation film covering surfaces of the transparent electrode and the reflecting electrode; a common electrode which is formed on the second substrate and faces the transparent electrode and the reflecting electrode; and a second vertical orientation film covering a surface of the common electrode. In the semi-transmissive liquid crystal display device, only the second vertical orientation film and the first orientation film on the transparent electrode are modified by light, a pretilt angle of liquid crystal molecules on an interface between the first and second orientation films is 45° or more, and the liquid crystal molecules in the transmission region are subjected to bend orientation.

Moreover, the foregoing object is achieved by a method for manufacturing a semi-transmissive liquid crystal display device, which is formed by sealing liquid crystal of negative dielectric anisotropy between first and second substrates and has a transmission region controlling transmitted light and a reflection region controlling reflected light, characterized by including: a first step of forming a transparent electrode made of a transparent conductor in the transmission region of the first substrate, forming a reflecting electrode made of metal in the reflection region, and forming a first vertical orientation film on the transparent electrode and the reflecting electrode; a second step of performing first pretilt direction determination processing in which light is irradiated obliquely from a plane side on which the reflecting electrode is not formed, only the first vertical orientation film in the transmission region is modified by light, and a pretilt angle of liquid crystal molecules is set to 45° or more; a third step of forming a common electrode, which faces the transparent electrode and the reflecting electrode, on the second substrate, and forming a second vertical orientation film covering a surface of the common electrode; and a fourth step of performing second pretilt direction determination processing in which light is irradiated from a plane side on which the common electrode is formed, the second vertical orientation film is modified by light, and the pretilt angle of the liquid crystal molecules is set to 45° or more. Note that the first and second steps may come before or after the third and fourth steps.

BRIEF DESCRIPTION OF THE DRAWINGS

FIG. 19 is a plan view showing a TFT substrate of a semi-transmissive liquid crystal display device according to a second embodiment of the present invention.

DESCRIPTION OF THE PREFERRED EMBODIMENT

The present invention will be described more in detail below.

Figure 1A:
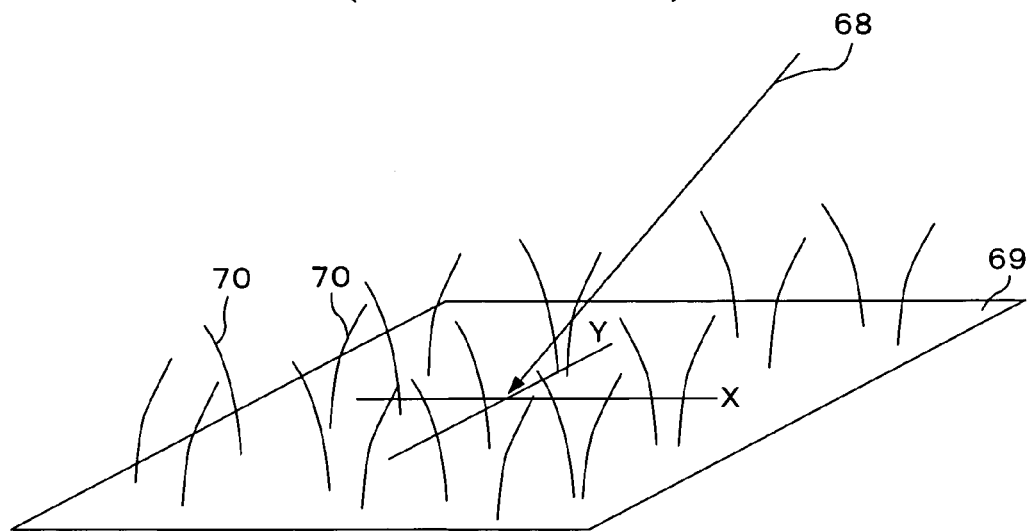
FIGS. 1A and 1B are schematic views showing pretilt direction determination processing by use of ultraviolet rays, which is described in Japanese Patent Laid-Open No. Hei 11(1999)-133429.
Figure 1B:
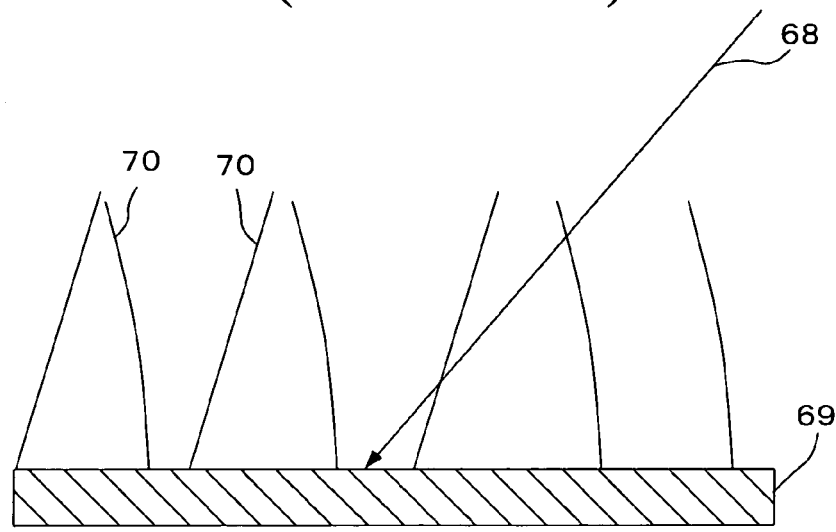
Figure 2:
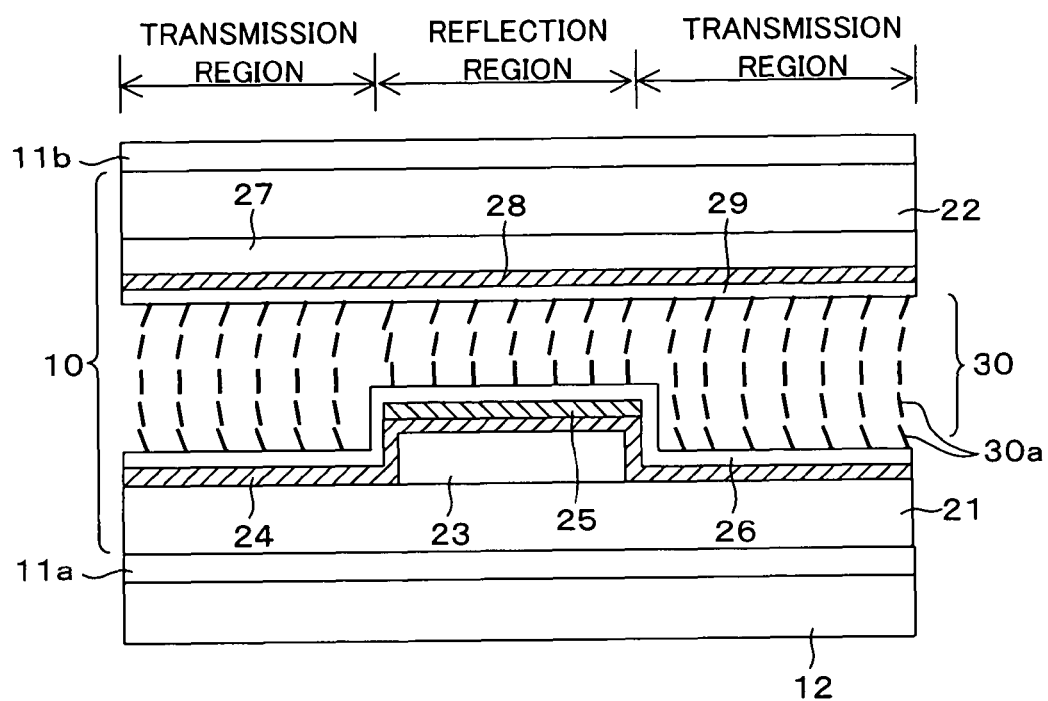
FIG. 2 is a schematic view showing the principle of the present invention.

FIG. 2 is a schematic view showing the principle of the present invention. As shown in FIG. 2, a semi-transmissive liquid crystal display device of the present invention includes a liquid crystal panel 10, a pair of polarizing plates (circularly polarizing plates) 11a and 11b which are disposed so as to sandwich the liquid crystal panel 10 therebetween, and a backlight unit 12 disposed on a back side of the liquid crystal panel 10 (below the polarizing plate 11a in FIG. 2). Moreover, the liquid crystal panel 10 includes a TFT substrate 21, a counter substrate 22, and a liquid crystal layer 30 formed of liquid crystal of negative dielectric anisotropy, which is sealed between the substrates 21 and 22. In one picture element region, a transmission region in which an amount of transmitted light is controlled, and a reflection region in which an amount of reflected light is controlled are provided.

In the reflection region on the TFT substrate 21, an insulating film 23 for controlling a thickness of the liquid crystal layer 30 is formed. This insulating film 23 causes the liquid crystal layer 30 to be thinner (for example, about ½) in the reflection region than in the transmission region. Moreover, on the substrate 21 and the insulating film 23, a transparent electrode 24 made of a transparent conductor such as ITO (indium-tin oxide) is formed. On the transparent electrode 24 in the reflection region, a reflecting electrode 25 made of highly reflective metal such as aluminum is formed. Surfaces of the reflecting electrode 25 and the transparent electrode 24 are covered with a vertical orientation film 26 made of polyimide, for example.

Note that, although the transparent electrode 24 is formed below the reflecting electrode 25 in FIG. 2, the transparent electrode 24 may be formed on the reflecting electrode 25. Moreover, if the transparent electrode 24 in the transmission region and the reflecting electrode 25 are electrically connected to each other, no transparent electrode 24 may be formed in the reflection region.

Meanwhile, on the counter substrate 22, for example, as shown in FIG. 2, a color filter 27, a common electrode 28 and a vertical orientation film 29 are formed. Here, as to the color filter 27, there are three kinds of color filters, including red, green and blue. It is assumed here that any one of the color filters is provided for each picture element. The common electrode 28 is made of a transparent conductor such as ITO formed on the color filter 27, and faces the transparent electrode 24 and the reflecting electrode 25 in the picture element on the TFT substrate 21 side. The surface of this common electrode 28 is covered with the vertical orientation film 29 made of polyimide, for example.

In the present invention, the entire vertical orientation film 29 on the counter substrate 22 side and a portion of the vertical orientation film 26 on the TFT substrate 21 side in the transmission region are subjected to processing for determining a pretilt direction of liquid crystal molecules 30a (for example, ultraviolet irradiation processing). The liquid crystal molecules 30a in the vicinity of the vertical orientation films 26 and 29 subjected to this pretilt direction determination processing tilt in a predetermined direction (to the left in FIG. 2) at an angle of 85°, for example, to the substrate surfaces when no voltage is applied thereto. Thus, in the transmission region, the liquid crystal molecules 30a are subjected to bend orientation as shown in FIG. 2. Stability of the bend orientation largely depends on a pretilt angle of the liquid crystal molecules. If the pretilt angle is less than 45°, splay orientation is likely to occur, and if the pretilt angle is 45° or more, the bend orientation is likely to occur. In the present invention, since the vertical orientation films and the liquid crystal of the negative dielectric anisotropy are used, it is easy to set the pretilt angle of the liquid crystal molecules to 45° or more. Thus, stable bend orientation can be achieved in the state where no voltage is applied.

Moreover, a portion of the vertical orientation film 26 on the TFT substrate 21 side in the reflection region is not subjected to the pretilt direction determination processing. Thus, in the reflection region, the liquid crystal molecules 30a in the vicinity of the surface of the orientation film 26 are oriented approximately perpendicularly to the substrate surface. Accordingly, as shown in FIG. 2, between the reflecting electrode 25 and the counter substrate 22, the liquid crystal molecules 30a are continuously arranged while gradually changing tilt angles. In this case, the thickness of the liquid crystal layer 30 in the reflection region is set to be thinner (about ½) than that in the transmission region. Thus, the orientation state of the liquid crystal molecules 30a in the liquid crystal layer 30 in the reflection region is set approximately the same as that of the liquid crystal molecules 30a in an upper half region of the liquid crystal layer 30 in the transmission region. Therefore, the orientation of the liquid crystal molecules 30a on a boundary between the reflection region and the transmission region is not disturbed. Thus, lowering of an effective aperture ratio is prevented.

Figure 3A:
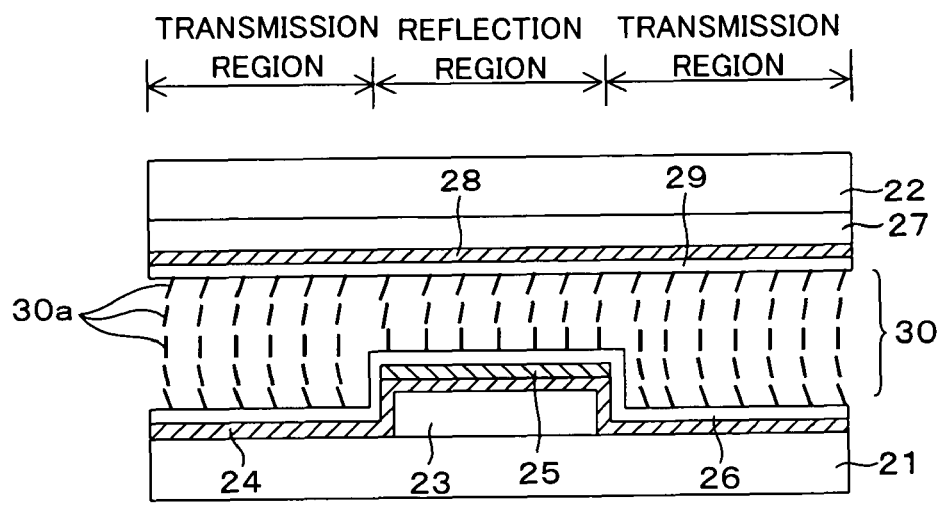
FIG. 3A is a schematic view showing orientation of liquid crystal molecules in black display.
Figure 3B:
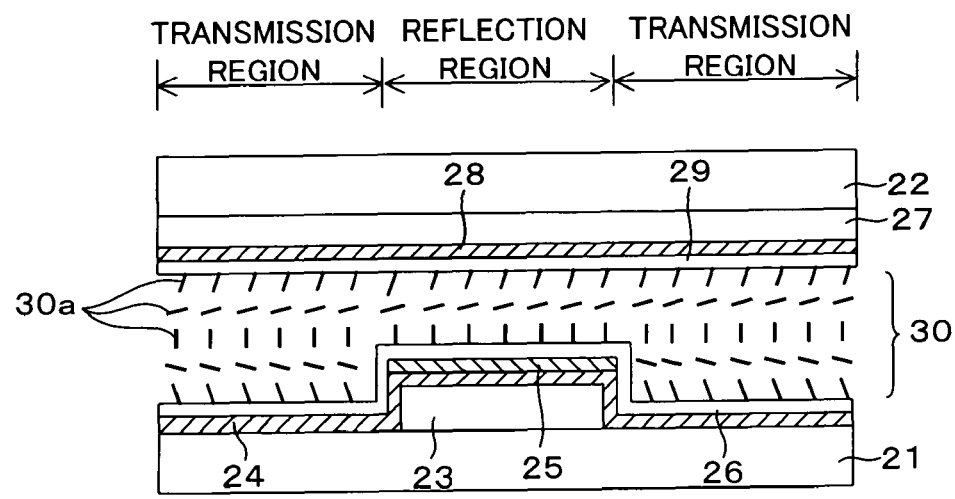
FIG. 3B is a schematic view showing orientation of liquid crystal molecules in while display.

Moreover, for example, in black display (when no voltage is applied), the liquid crystal molecules 30a are oriented as shown in FIG. 3A, and, in white display, the liquid crystal molecules 30a are oriented as shown in FIG. 3B. As shown in FIGS. 3A and 3B, behavior of the liquid crystal molecules 30a in the liquid crystal layer 30 in the reflection region comes to be approximately the same as behavior of the liquid crystal molecules 30a in the upper half region of the liquid crystal layer 30 in the transmission region. Therefore, even if the applied voltage is changed, there is no change in the stable orientation of the liquid crystal molecules 30a in the reflection region and the transmission region.

Figure 4:
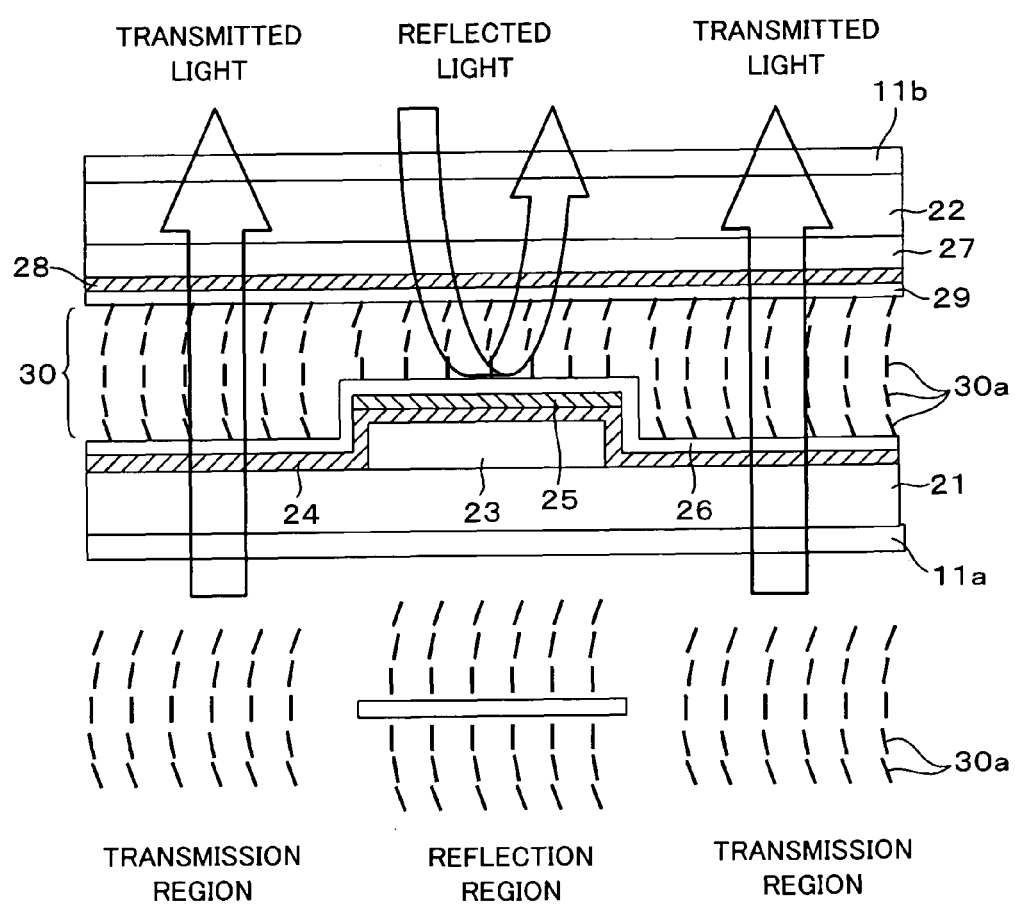
FIG. 4 is a schematic view showing a state of orientation of liquid crystal molecules along an optical path of transmitted light, and a state of orientation of liquid crystal molecules along an optical path of reflected light.

Furthermore, as shown in FIG. 4, the orientation state of the liquid crystal molecules 30a along an optical path of transmitted light is approximately the same as the orientation state of the liquid crystal molecules 30a along an optical path of reflected light. Thus, light emitted toward the face of the panel after transmitted through the transmission region and light emitted toward the face of panel after reflected by the reflection region have the same phase difference conditions. Therefore, optical compensation conditions in the black display can be made uniform in the reflection region and the transmission region.

With reference to the accompanying drawings, specific embodiments of the present invention will be described below.

First Embodiment

Figure 5:
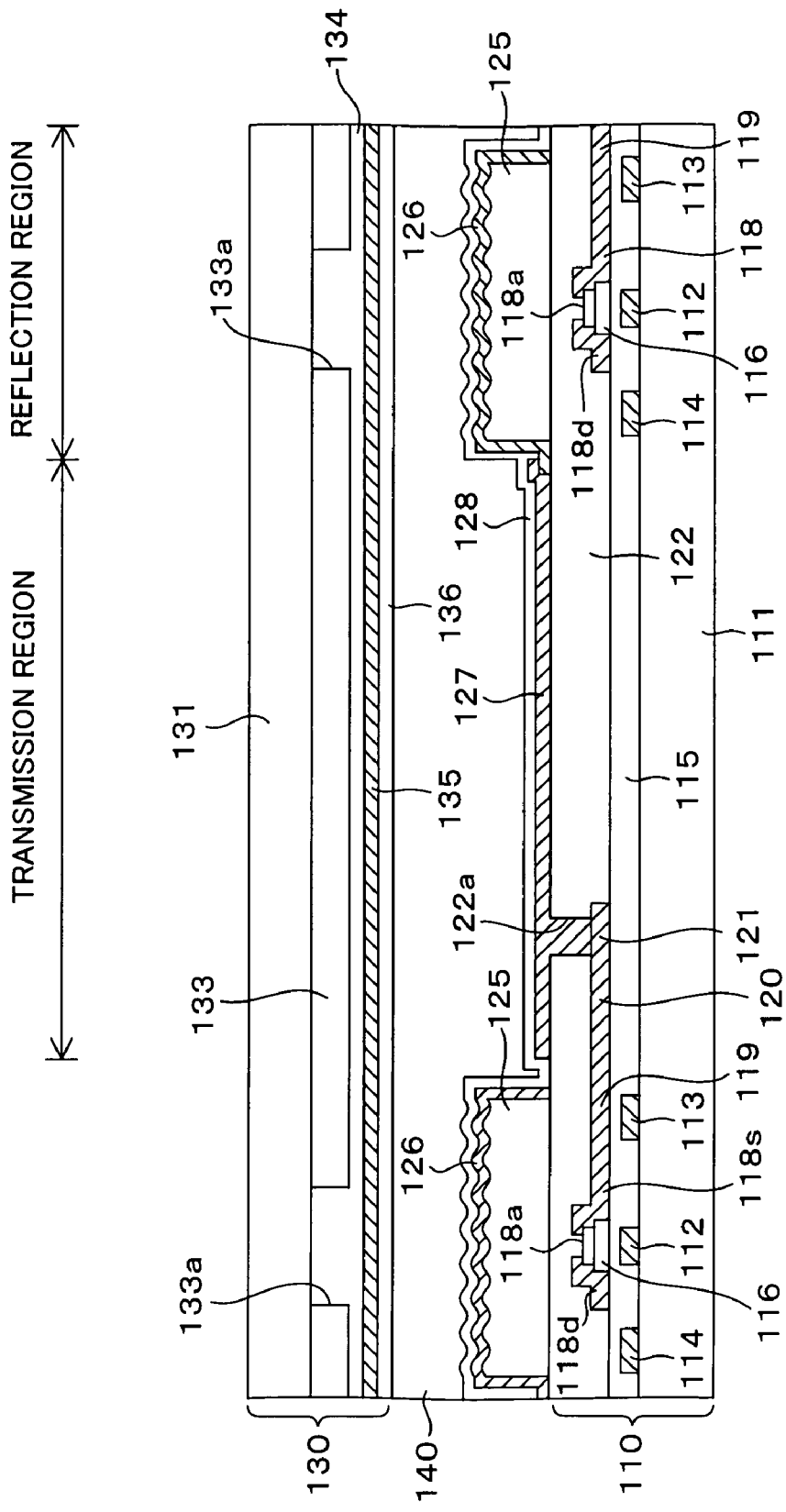
FIG. 5 is a schematic cross-sectional view showing a semi-transmissive liquid crystal display device according to a first embodiment of the present invention.
Figure 6:
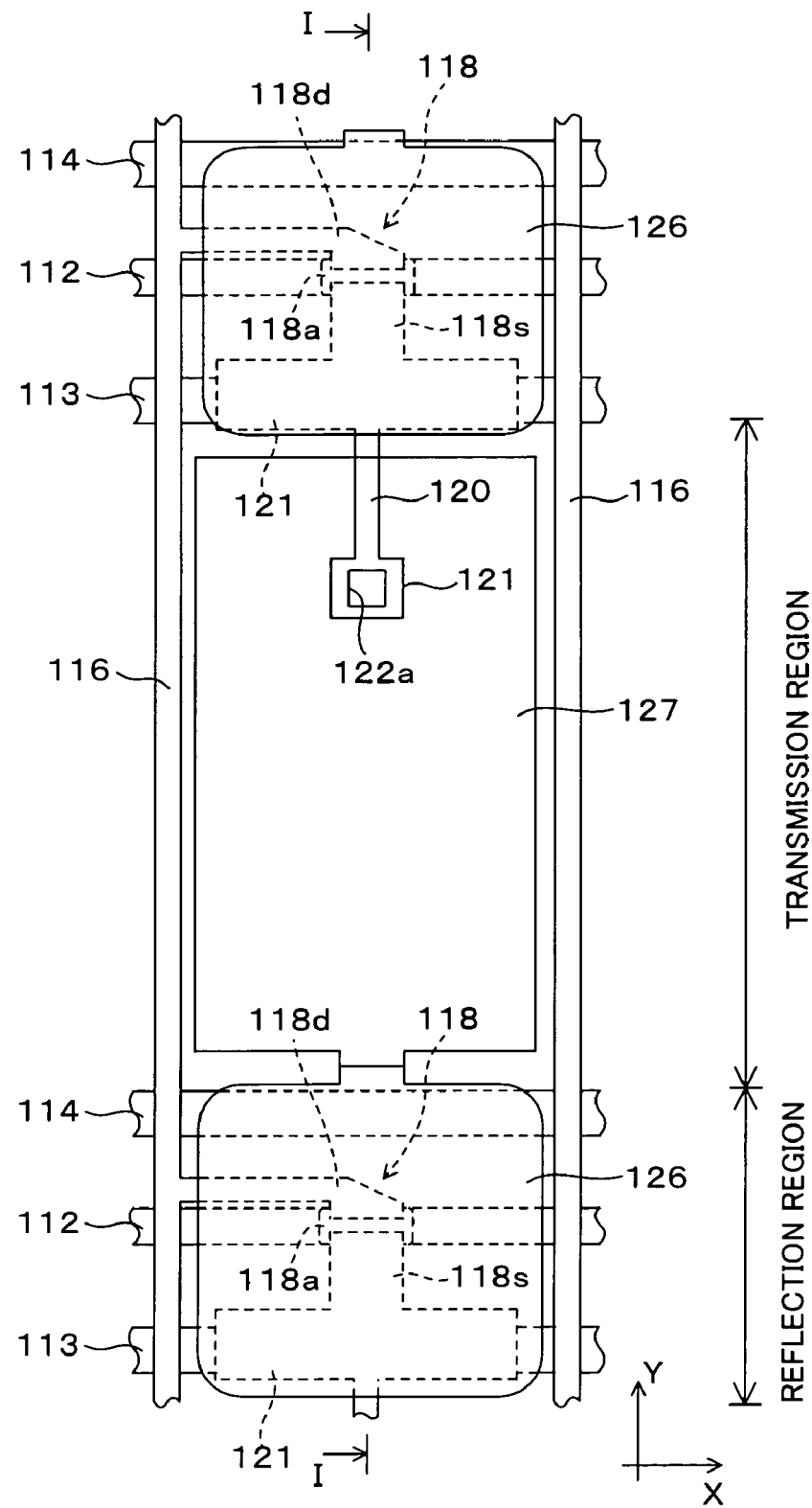
FIG. 6 is a plan view showing a TFT substrate of the semi-transmissive liquid crystal display device.
Figure 7:
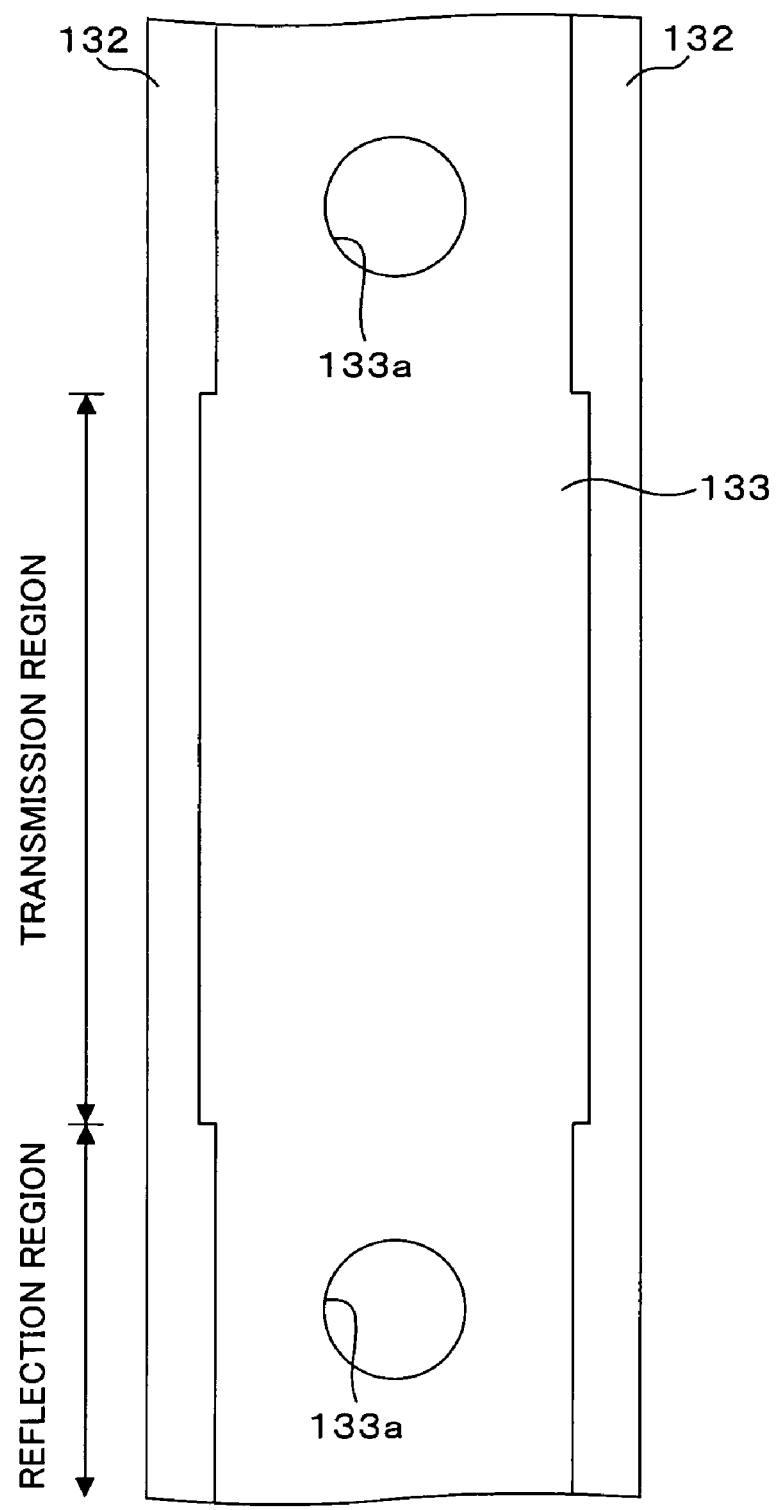
FIG. 7 is a plan view showing a counter substrate of the semi-transmissive liquid crystal display device.

FIG. 5 is a schematic cross-sectional view showing a semi-transmissive liquid crystal display device according to a first embodiment of the present invention. FIG. 6 is a plan view showing a TFT substrate of the semi-transmissive liquid crystal display device. FIG. 7 is a plan view showing a counter substrate of the semi-transmissive liquid crystal display device. Note that FIG. 5 shows a cross section at the position of the line I-I in FIG. 6. Moreover, in FIG. 5, polarizing plates, a backlight and the like are omitted from illustration.

As shown in FIG. 5, the liquid crystal display device of this embodiment includes a TFT substrate 110, a counter substrate 130 and a liquid crystal layer 140 made of liquid crystal of negative dielectric anisotropy, which is sealed between the substrates 110 and 130. As shown in FIG. 6, in the TFT substrate 110, a plurality of gate bus lines 112, auxiliary capacitance bus lines 113 and dummy patterns 114, all of which extend in a horizontal direction (X direction), and a plurality of data bus lines 116 extending in a vertical direction (Y direction) are formed. The respective auxiliary capacitance bus lines 113 and dummy patterns 114 are disposed so as to sandwich the respective gate bus lines 112 therebetween.

In this embodiment, respective picture element regions are defined by auxiliary capacitance bus lines 113 and data bus lines 116. Moreover, one picture element region is divided into a transmission region in which a transparent electrode 127 is disposed, and a reflection region in which a reflecting electrode 126 is disposed.

As shown in FIG. 5, a thick insulating film 125 is formed below the reflecting electrode 126, and an average thickness of the liquid crystal layer 140 in the reflection region is set to be about ½ of that of the liquid crystal layer 140 in the transmission region. In a surface of the insulating film 125, minute irregularities are formed, and minute irregularities are also provided in a surface of the reflecting electrode 126 so as to match the surface of the insulating film 125. In this embodiment, it is assumed that the average thickness of the liquid crystal layer 140 in the reflection region is set to 2 μm, and the thickness of the liquid crystal layer 140 in the transmission region is set to 4 μm. Note that a number of spacers (not shown) are provided between the TFT substrate 110 and the counter substrate 130. These spacers maintain a fixed gap between the TFT substrate 110 and the counter substrate 130.

As shown in FIGS. 5 and 6, under the reflecting electrode 126, a TFT 118 and an auxiliary capacitance electrode 119 are formed, which are electrically connected to the transparent electrode 127 of an adjacent picture element (a picture element of the next line). The TFT 118 uses part of the gate bus line 112 as a gate electrode. A drain electrode 118d of this TFT 118 is connected to the data bus line 116, and a source electrode 118s thereof is connected to the auxiliary capacitance electrode 119. As shown in FIG. 5, the auxiliary capacitance electrode 119 is disposed in a position facing the auxiliary capacitance bus line 113 across an insulating film 115. This auxiliary capacitance electrode 119 forms an auxiliary capacitance, together with the auxiliary capacitance bus line 113 and the insulating film 115. Note that the auxiliary capacitance bus line 113 and the dummy pattern 114 are disposed in portions facing edges of the reflecting electrode 126, respectively.

A wiring 120 connects the auxiliary capacitance electrode 119 to a pad 121 disposed below the transparent electrode 127. The transparent electrode 127 is electrically connected to the pad 121 through a contact hole 122a. Moreover, an end of the transparent electrode 127 overlaps an end of the reflecting electrode 126 in the own picture element, and is electrically connected to the reflecting electrode 126.

Layered structures of the TFT substrate 110 and the counter substrate 130 will be described below. First, the layered structure of the TFT substrate 110 will be described with reference to FIGS. 5 and 6.

On a glass substrate 111 to be a base of the TFT substrate 110, the gate bus lines 112, the auxiliary capacitance bus lines 113 and the dummy patterns 114 are formed. These gate bus lines 112, the auxiliary capacitance bus lines 113 and the dummy patterns 114 are simultaneously formed by forming a Al (aluminum)/Ti (titanium) lamination film, for example, and patterning this lamination film by use of a photolithography method.

The gate bus lines 112, the auxiliary capacitance bus lines 113 and the dummy patterns 114 are covered with the first insulating film 115 made of insulating material such as $SiO_2$ and SiN. In a predetermined region on this first insulating film 115, a semiconductor film (an amorphous silicon film or a polysilicon film) 116 to be an active layer of the TFT 118 is formed. Moreover, on a region to be a channel of the semiconductor film 116, a channel protective film 118a made of SiN, for example, is formed.

The source electrode 118s and drain electrode 118d of the TFT 118 are formed so as to sandwich the channel protective film 118a therebetween. The drain electrode 118d is connected to the data bus line 116 formed on the first insulating film 115, and the source electrode 118s is connected to the auxiliary capacitance electrode 119, the wiring 120 and the pad 121 provided at the end of the wiring, all of which are formed on the first insulating film 115. The source electrode 118s, the drain electrode 118d, the auxiliary capacitance electrode 119, the wiring 120 and the pad 121 are simultaneously formed by forming a Ti/Al/Ti lamination film, for example, and patterning this lamination film by use of the photolithography method.

The TFT 118, the auxiliary capacitance electrode 119, the wiring 120 and the pad 121 are covered with a second insulating film 122 made of insulating material such as $SiO_2$ and SiN. On the insulating film 122 in the reflection region, the insulating film 125 for controlling the thickness of the liquid crystal layer 140 is formed. This insulating film 125 is formed by use of a photoresist, for example, and minute irregularities are provided in a surface thereof. On the surface of this insulating film 125, the reflecting electrode 126 made of highly reflective metal such as Al is formed. This reflecting electrode 126 is formed by forming an Al film on an entire upper surface of the glass substrate 111, for example, and patterning this Al film by use of the photolithography method. In a surface of the reflecting electrode 126, minute irregularities are also formed so as to match the surface of the insulating film 125.

Meanwhile, on the second insulating film 122 in the transmission region, a transparent electrode 127 made of a transparent conductor such as ITO is formed. This transparent electrode 127 is electrically connected to the pad 121 through the contact hole 122a formed in the second insulating film 122, and an end thereof overlaps an end of the reflecting electrode 126 to be electrically connected thereto. The transparent electrode 127 is formed, for example, by forming an ITO film on the entire upper surface of the glass substrate 111 and patterning this ITO film by use of the photolithography method.

Figure 8A:
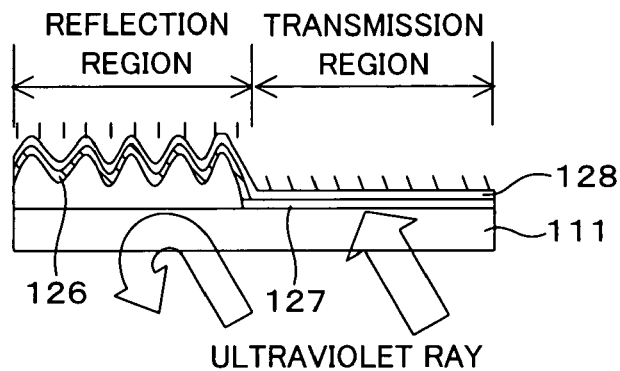
FIGS. 8A and 8B are schematic views showing pretilt direction determination processing for the TFT substrate.
Figure 8B:
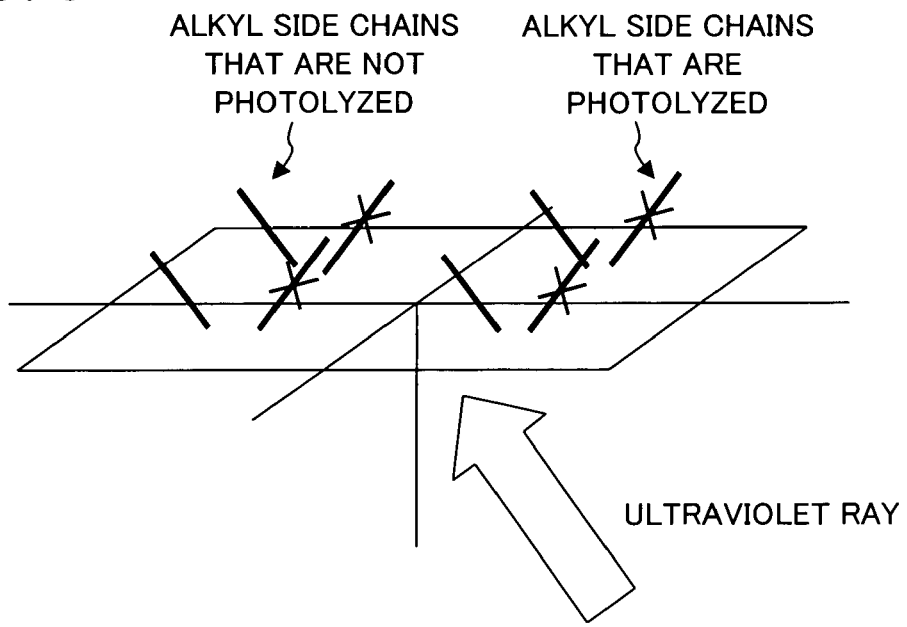

The surfaces of the reflecting electrode 126 and the transparent electrode 127 are covered with a vertical orientation film 128 made of polyimide or the like. As shown in FIG. 8A, this vertical orientation film 128 is subjected to pretilt direction determination processing in which an ultraviolet ray is irradiated obliquely from a back side of the glass substrate 111 (from a plane opposite to the plane on which the orientation film 128 is formed). As shown in FIG. 8B, on the orientation film 128 in the transmission region, alkyl side chains in a direction orthogonal to an ultraviolet irradiation direction are photolyzed by the pretilt direction determination processing. Accordingly, liquid crystal molecules are pretilted in a predetermined direction with respect to the substrate surface. However, since there is the reflecting electrode 126, the ultraviolet ray is not irradiated onto the orientation film 128 in the reflection region. Thus, the liquid crystal molecules on the orientation film 128 in the reflection region are oriented approximately perpendicularly to the substrate surface.

Next, with reference to FIGS. 5 and 7, the layered structure of the counter substrate 130 will be described.

On (below, in FIG. 5) a glass substrate 131 to be a base of the counter substrate 130, a black matrix (shielding film) 132 is formed in a position facing the gate bus line 112 of the TFT substrate 110. This black matrix 132 is formed of metal such as Cr (chrome) or black resin, for example.

Moreover, on the glass substrate 131 and the black matrix 132, a color filter 133 is formed. In this color filter 133, circular openings 133a are provided in positions facing the reflecting electrode 126 on the TFT substrate 110 side. A transparent resin film 134 is formed on the color filter 133, and resin forming the transparent resin film 134 is buried in the openings 133a of the color filter 133.

Figure 9A:
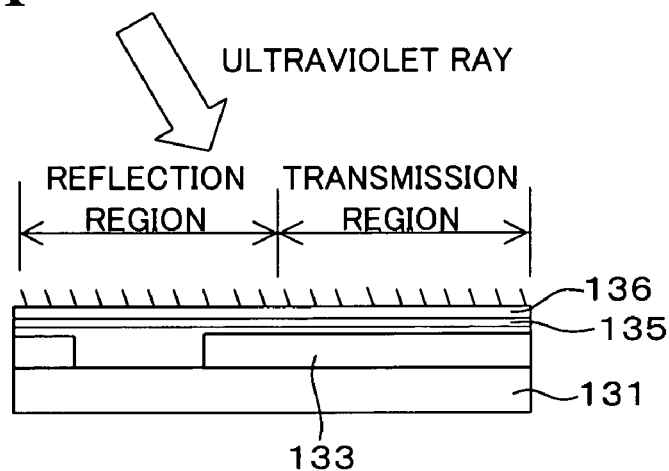
FIGS. 9A and 9B are schematic views showing pretilt direction determination processing for the counter substrate.
Figure 9B:
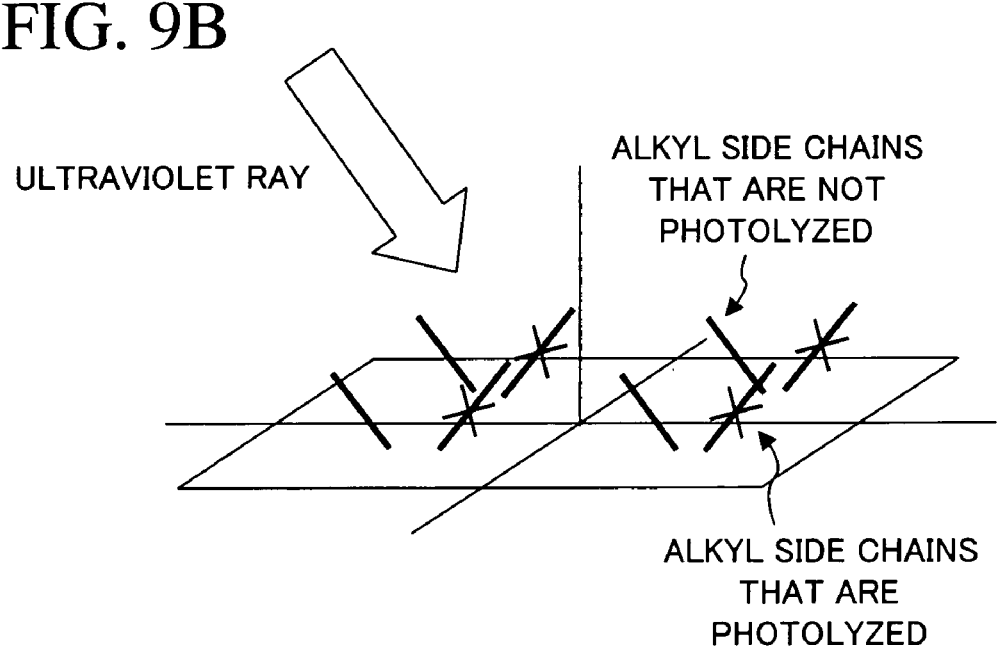

On the transparent resin film 134, a common electrode 135 made of a transparent conductor such as ITO is formed. A surface of this common electrode 135 is covered with a vertical orientation film 136 made of polyimide or the like. As shown in FIG. 9A, this vertical orientation film 136 is subjected to pretilt direction determination processing in which an ultraviolet ray is irradiated obliquely onto the surface of the glass substrate 131 (the plane on which the orientation film 136 is formed). As shown in FIG. 9B, on the orientation film 136, alkyl side chains in a direction orthogonal to an ultraviolet irradiation direction are photolyzed by the pretilt direction determination processing. Accordingly, liquid crystal molecules are pretilted in a predetermined direction.

Note that the openings 133a of the color filter 133 are provided to match chromaticity of the transmission region and that of the reflection region. Specifically, if there are no openings 133a, light passes through the color filter 133 only once in the transmission region. On the other hand, light passes through the color filter 133 twice (back and forth) in the reflection region. Thus, there arises a difference in chromaticity. However, by providing the openings in the color filter 133 as shown in this embodiment, the chromaticity of the reflection region and that of the transmission region can be set approximately the same.

As described above, in the liquid crystal display device of this embodiment, the thickness of the liquid crystal layer in the reflection region is set to be about ½ of that of the liquid crystal layer in the transmission region. In addition, the entire vertical orientation film 136 on the counter substrate 130 side and the vertical orientation film 128 on the TFT substrate 110 side in the transmission region are subjected to the pretilt direction determination processing so as to set the pretilt angle to 45° or more. Furthermore, the liquid crystal layer 140 is formed of the liquid crystal of negative dielectric anisotropy. Thus, the orientation state of the liquid crystal molecules in the liquid crystal layer 140 in the reflection region is set to be approximately the same as the orientation of the liquid crystal molecules in the upper half region of the liquid crystal layer 140 in the transmission region. Consequently, the bend orientation of the liquid crystal molecules in the transmission region is stabilized, and the transmitted light and the reflected light can be effectively used. Thus, good display characteristics can be obtained in both cases where the liquid crystal display device is used in a transmissive mode and where the device is used in a reflective mode. Moreover, since the liquid crystal molecules are subjected to the bend orientation, a response speed of the liquid crystal molecules is fast.

Hereinafter, description will be given of results obtained by actually manufacturing the liquid crystal display device according to this embodiment (Application Example) and comparing characteristics thereof to those of a liquid crystal display device of a comparative example.

First, as shown in FIGS. 5 and 6, on the glass substrate 111 to be the base of the TFT substrate 110, the gate bus lines 112, the auxiliary capacitance bus lines 113, the dummy patterns 114, the first insulating film 115, the data bus lines 116, the TFTs 118, the auxiliary capacitance electrodes 119, the second insulating film 122 and the like are formed. Next, a photoresist film is applied onto the second insulating film 122, and this photoresist film is patterned into a predetermined shape. Accordingly, the insulating film 125 having a thickness of about 2 μm is formed in the reflection region. Thereafter, after a surface of the insulating film 125 is cured by ion irradiation, the film is heat-treated to form minute irregularities (wrinkles) in the surface thereof. The shape of the irregularities matches the shapes of the gate bus lines 112 and the data bus lines 116.

Next, after the reflecting electrodes 126 and the transparent electrode 127 are formed, the vertical orientation film 128 is formed by use of a vertical orientation film material of a photolytic reaction type (manufactured by JSR Corp.). Thereafter, an ultraviolet ray is irradiated from a predetermined direction on the back side (the plane opposite to the plane on which the orientation film 128 is formed), and the vertical orientation film 128 in the transmission region is subjected to the pretilt direction determination processing.

Moreover, on the glass substrate 131 to be the base of the counter substrate 130, the black matrix 132, the color filter 133, the transparent resin film 134, and the common electrode 135 are formed. The color filter 133 is formed to have a thickness of 1.3 µm, and the circular openings 133a having an area equivalent to about 25% of the reflection region are formed in the reflection region. On the common electrode 135, the vertical orientation film 136 is formed by use of the vertical orientation film material of the photolytic reaction type (manufactured by JSR Corp.).

Next, an ultraviolet ray is irradiated from a predetermined direction on the surface side (the plane side on which the orientation film 136 is formed), and the entire orientation film 136 is subjected to the pretilt direction determination processing.

After the TFT substrate 110 and the counter substrate 130 are fabricated as described above, spacers having a diameter of 4 µm are scattered on the counter substrate 130, and the counter substrate 130 and the TFT substrate 110 are attached to each other by use of a sealing material. Thereafter, liquid crystal of negative dielectric anisotropy (manufactured by Chisso Corporation) is sealed between the substrates, thus obtaining a liquid crystal panel. Subsequently, polarizing plates (manufactured by Sumitomo Chemical Co., Ltd.) and optical compensation films (manufactured by Fuji Photo Film Co., Ltd.) are attached to both sides of the liquid crystal panel. Furthermore, a backlight unit is attached to the liquid crystal panel. Thus, the liquid crystal display device of Application Example 1 is manufactured.

Note that, usually, circularly polarizing plates combining a linear polarizer and a λ/4 plate are used as the polarizing plates in the semi-transmissive liquid crystal display device. However, here, in order to clarify the orientation direction of the liquid crystal, only the linear polarizers are used as the polarizing plates.

Meanwhile, a liquid crystal display device of Comparative Example 1 is manufactured by use of a method similar to that of Application Example 1, except that a horizontal orientation film material (manufactured by JSR Corp.) is used as the orientation film material, and liquid crystal of positive dielectric anisotropy (manufactured by Merck Ltd.) is used as the liquid crystal.

In the liquid crystal display devices of Application Example 1 and Comparative Example 1, which are manufactured as described above, pretilt angles of liquid crystal molecules are measured. As a result, in the liquid crystal display device of Application Example 1, the pretilt angle of the liquid crystal molecules in the vicinity of reflection electrode is about 90°, and both of the pretilt angles of the liquid crystal molecules in the vicinity of the common electrode and in the vicinity of the transparent electrode are about 85°. Moreover, in the liquid crystal display device of Comparative Example 1, the pretilt angle of the liquid crystal molecules in the vicinity of the reflecting electrode is about 6°, and the pretilt angles of the liquid crystal molecules in the vicinity of the transparent electrode and in the vicinity of the common electrode are about 3°.

In the liquid crystal display device of Application Example 1, no disturbance is found in the orientation of the liquid crystal molecules on the boundary between the reflection region and the transmission region. Moreover, stability of the bend orientation in the transmission region is observed by conducting a finger pressing test. As a result, it is confirmed that, in the liquid crystal display device of Application Example 1, return to the bend orientation is faster than that of Comparative Example 1, and good stability of the bend orientation is achieved.

Front contrasts in the reflection and transmission regions of the liquid crystal display device of Application Example 1 are measured. As a result, the front contrast of the reflection region is about 20, and the front contrast of the transmission region is about 400. Meanwhile, in the liquid crystal display device of Comparative Example 1, a front contrast of the reflection region is about 10, and a front contrast of the transmission region is about 200. From the above results, it can be confirmed that the liquid crystal display device of Application Example 1 has better contrast characteristics than the liquid crystal display device of Comparative Example 1.

Second Embodiment

Figure 10:
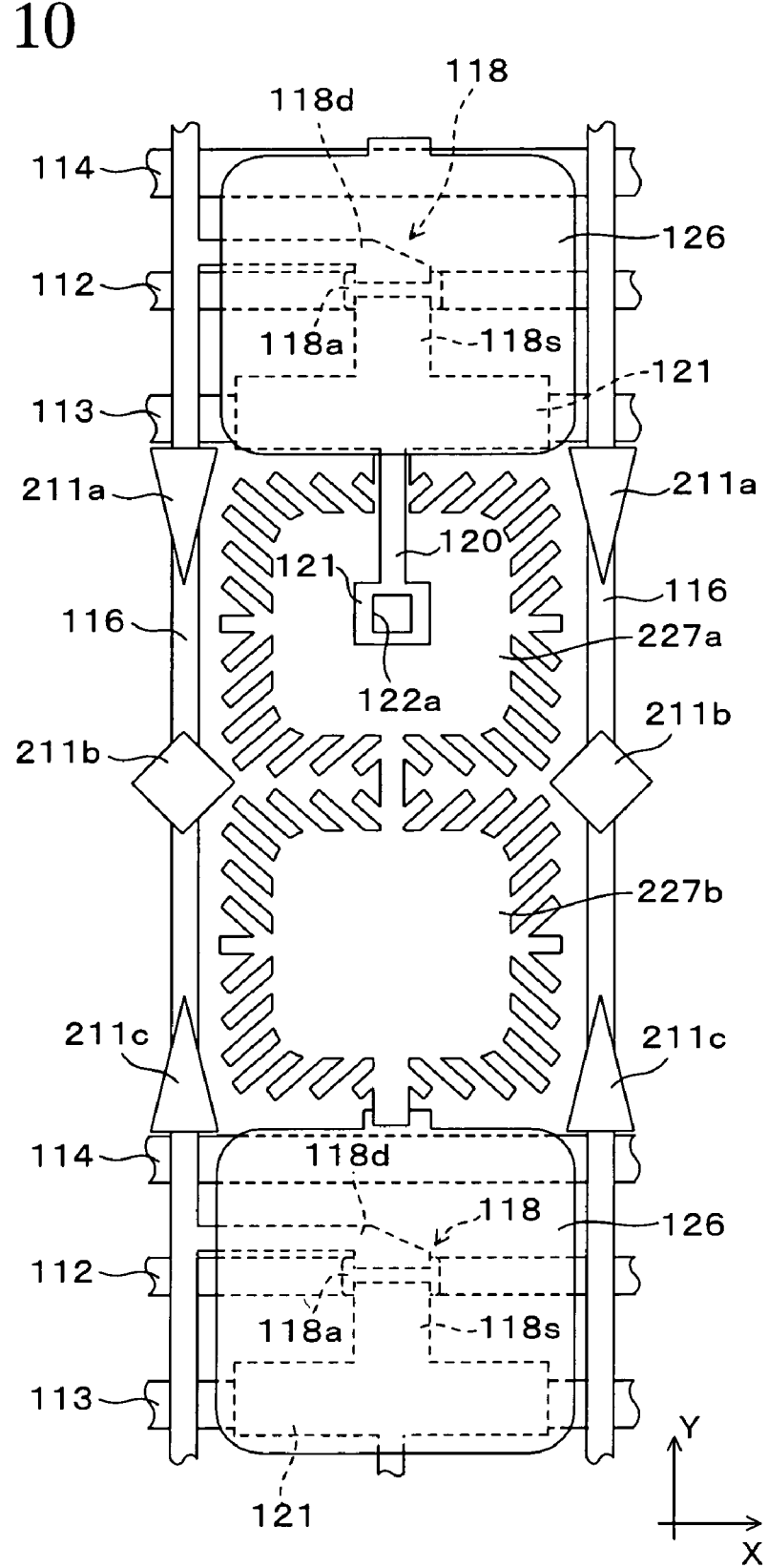
Figure 11:
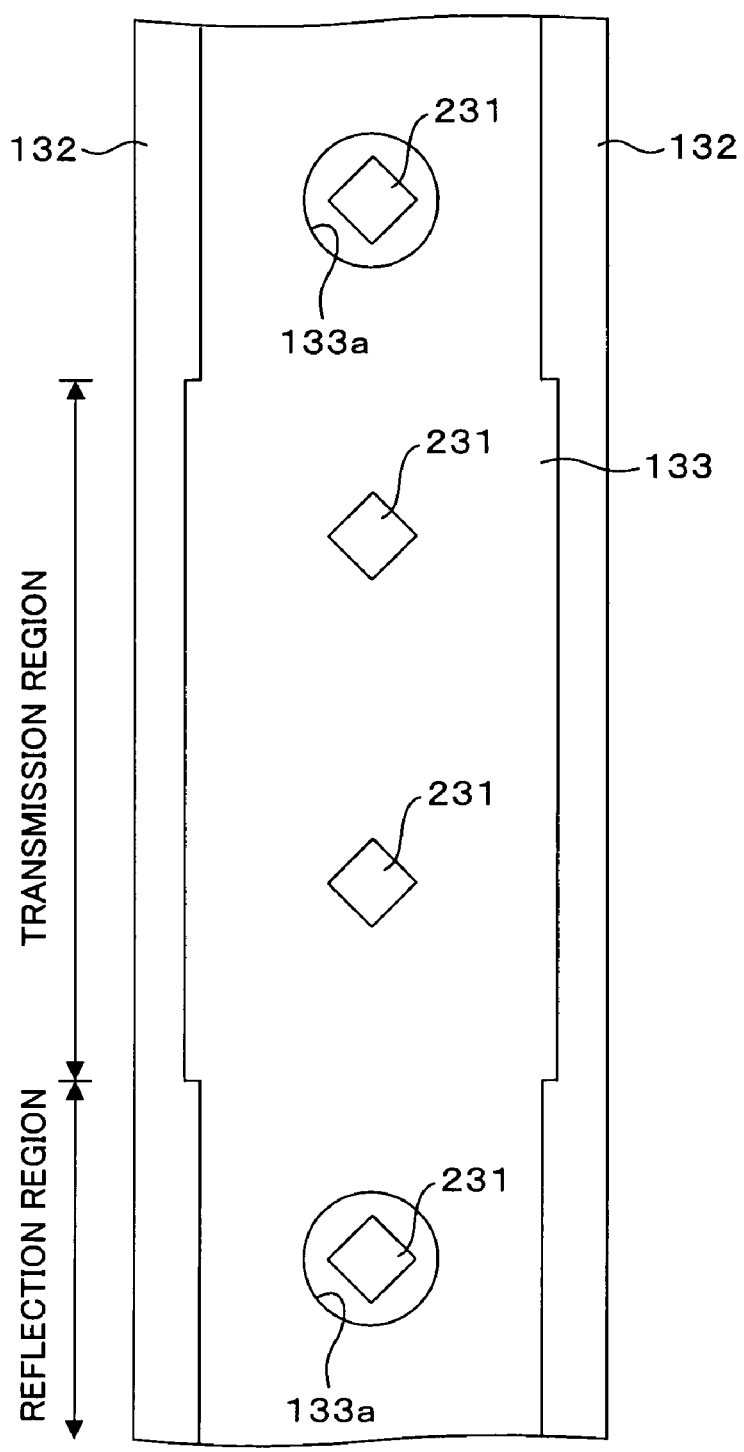
FIG. 11 is a plan view showing a counter substrate of the semi-transmissive liquid crystal display device.

FIG. 10 is a plan view showing a TFT substrate of a semi-transmissive liquid crystal display device according to a second embodiment of the present invention. FIG. 11 is a plan view showing a counter substrate of the semi-transmissive liquid crystal display device. Note that, in FIGS. 10 and 11, the same constituent components as those in FIGS. 6 and 7 are denoted by the same reference numerals, and detailed description thereof will be omitted.

In this embodiment, as shown in FIG. 10, two transparent electrodes 227a and 227b are formed side by side along data bus lines 116 in a transmission region. Each of these transparent electrodes 227a and 227b is electrically connected to a source electrode 118s of a TFT 118 and a reflecting electrode 126, as in the case of the first embodiment. Moreover, these transparent electrodes 227a and 227b are both formed to have an approximately rectangular shape, and slits extending in four directions are provided in edges thereof.

Specifically, in the edge of an upper right region (hereinafter referred to as a first region) of each of the transparent electrodes 227a and 227b, slits extending in an approximately 45° direction (the X direction is set to 0°, hereinafter the same) are provided. In the edge of an upper left region (hereinafter referred to as a second region) thereof, slits extending in an approximately 135° direction are provided. In the edge of a lower left region (hereinafter referred to as a third region) thereof, slits extending in an approximately 225° direction are provided. In the edge of a lower right region (hereinafter referred to as a fourth region) thereof, slits extending in an approximately 315° direction are provided. Thus, when a voltage is applied to the transparent electrodes 227a and 227b, liquid crystal molecules are likely to be tilted in predetermined directions (directions parallel to the slits).

Moreover, in the vicinities of four corners of the transparent electrodes 227a and 227b, protrusions 211a to 211c are formed as orientation control structures, respectively. These protrusions 211a to 211c have planes which intersect with the extending directions of the slits of the transparent electrodes 227a and 227b, and have a function of allowing the liquid crystal molecules in the transmission region to be easily tilted in the directions parallel to the slits. These protrusions 211a to 211c are formed of a photoresist, for example, and are disposed on the data bus lines 116.

Meanwhile, in the counter substrate, as shown in FIG. 11, protrusions 231 are also formed as orientation control structures. These protrusions 231 are disposed in positions facing center positions of the reflecting electrodes 126 and the transparent electrodes 227a and 227b. In this embodiment, a shape of a cross section of each of the protrusions 231 is a rhombus. The liquid crystal molecules have a characteristic that the molecules are oriented in a direction perpendicular to planes of these protrusions 231. Thus, the orientation direction of the liquid crystal molecules is also determined by these protrusions 231.

Figure 12:
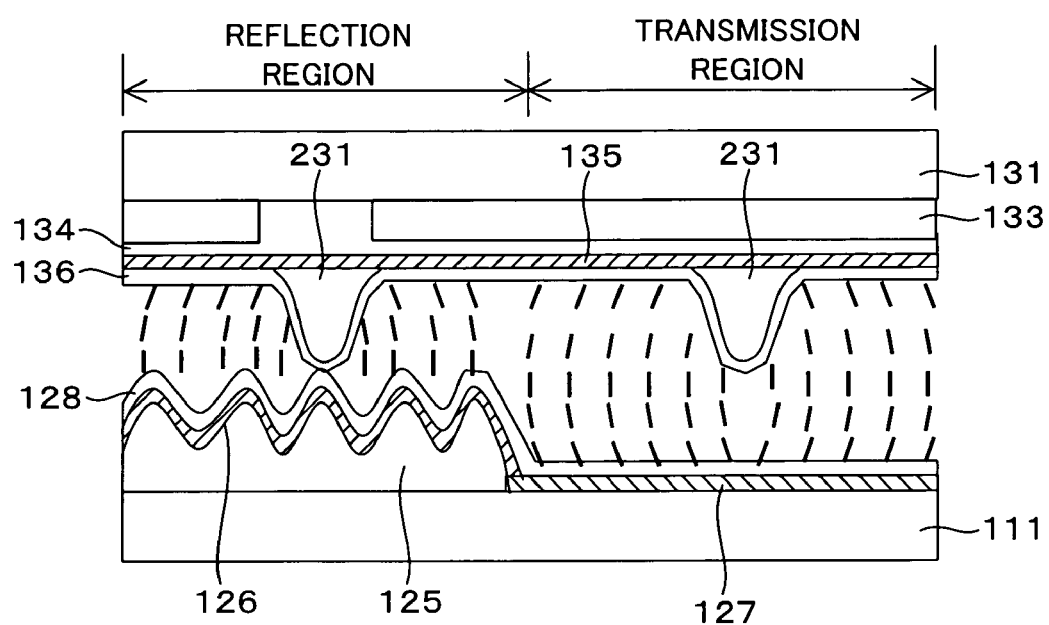
FIG. 12 is a schematic cross-sectional view of the semi-transmissive liquid crystal display device.

Moreover, the protrusions 231 provided in the reflection region also have a function as spacers for maintaining a fixed gap between the TFT substrate and the counter substrate by coming into contact with the TFT substrate as shown in a schematic view of FIG. 12.

In this embodiment, as in the case of the first embodiment, the liquid crystal sealed between the TFT substrate and the counter substrate is liquid crystal of negative dielectric anisotropy. Moreover, both of the orientation films 128 and 136 are vertical orientation films, and the entire orientation film 136 and a portion of the orientation film 128 in the transmission region are subjected to the pretilt direction determination processing in which the pretilt direction of the liquid crystal molecules is determined by ultraviolet irradiation.

Figure 13A:
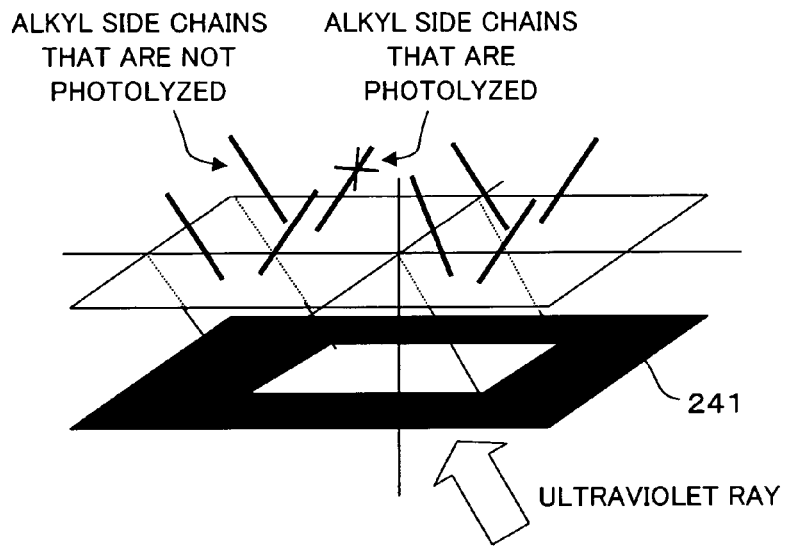
FIGS. 13A and 13B are schematic views showing pretilt direction determination processing for the TFT substrate and the counter substrate.

For example, as shown in FIG. 13A, an exposure mask 241 is disposed on a back side (a plane opposite to the plane on which the orientation film 128 is formed) of the TFT substrate so as to be distant from the TFT substrate. Thereafter, proximity exposure is performed, in which ultraviolet rays are irradiated individually onto the orientation film 128 in the first to fourth regions of the transparent electrodes 227a and 227b by changing a position of a light source. Thus, the liquid crystal molecules are pretilted in different directions, respectively, in the first to fourth regions. Here, it is assumed that a pretilt angle is about 85°, and a pretilt direction (a direction in the projection on the substrate surface) is a direction parallel to the slits of the transparent electrodes 227a and 227b. However, no ultraviolet ray is irradiated onto the orientation film 128 in the reflection region, and the liquid crystal molecules in the vicinity of the reflecting electrode 126 are pretilted approximately perpendicularly to the substrate surface.

Figure 13B:
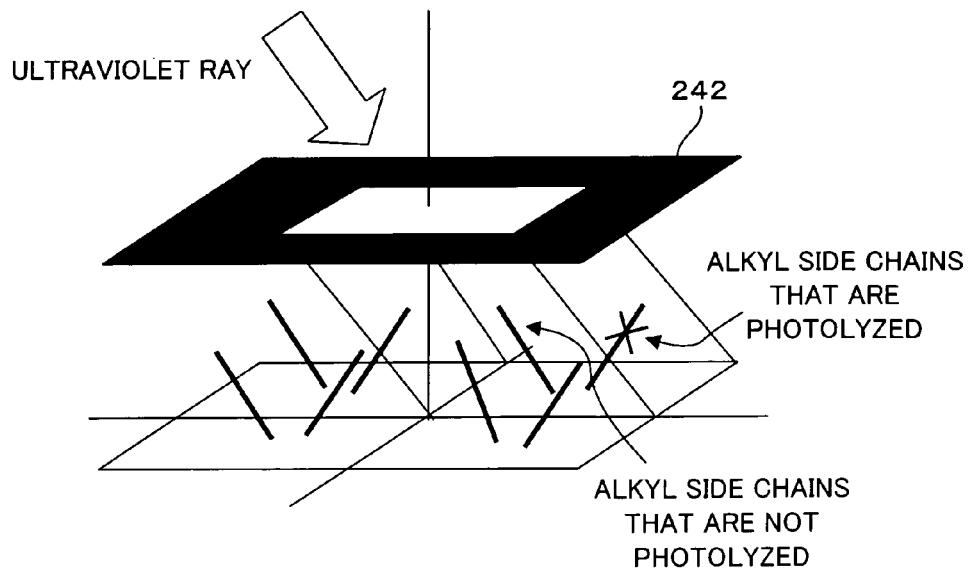

Moreover, as shown in FIG. 13B, an exposure mask 242 is disposed on a surface side (the plane on which the orientation film 136 is formed) of the counter substrate so as to be distant from the counter substrate. Thereafter, proximity exposure is performed, in which ultraviolet rays are irradiated, respectively, onto the orientation film 136 in the first to fourth regions by changing a position of a light source. Thus, a pretilt angle and a pretilt direction of the liquid crystal molecules in the first to fourth regions on the counter substrate side are decided. Accordingly, the pretilt angle is set to about 85°, for example, and the pretilt direction is set to the extending direction of the slits of the transparent electrodes 227a and 227b. Moreover, similarly, the reflection region is also divided into first to fourth regions, and ultraviolet rays are irradiated from different directions onto the orientation film 136 in the respective regions. Accordingly, a pretilt angle of the liquid crystal molecules in the first to fourth regions is set to about 85°, and a pretilt direction is set to a direction corresponding to the pretilt direction in the transmission region.

In the liquid crystal display device of this embodiment, by the slits of the transparent electrodes 227a and 227b, the protrusions 211a to 211c on the TFT substrate side, the protrusions 231 on the counter substrate side, and the pretilt direction determination processing applied to the vertical orientation films 128 and 136, the liquid crystal molecules are tilted in four directions when a voltage is applied, and a so-called multi-domain is achieved. Consequently, in the liquid crystal display device of this embodiment, in addition to the same effect as that of the first embodiment, an effect that viewing angle characteristics are significantly improved can be obtained.

Hereinafter, description will be given of results obtained by actually manufacturing the liquid crystal display device according to this embodiment (Application Example 2) and comparing characteristics thereof to those of the above-described liquid crystal display devices of Application Example 1 and Comparative Example 1 and a new liquid crystal display device of Comparative Example 2.

First, on the glass substrate to be the base of the TFT substrate, the gate bus lines 112, the auxiliary capacitance bus lines 113, the dummy patterns 114, the first insulating film 115, the data bus lines 116, the TFTs 118, the auxiliary capacitance electrodes 119, the second insulating film 122 and the like are formed. Next, a photoresist film is applied onto the second insulating film 122, and this photoresist film is patterned into a predetermined shape. Accordingly, the insulating film 125 having a thickness of about 2 µm is formed in the reflection region. Thereafter, after a surface of the insulating film 125 is cured by ion irradiation, the film is heat-treated to form minute irregularities (wrinkles) in the surface thereof. The shape of the irregularities matches the shapes of the gate bus lines 112 and the data bus lines 116.

Next, after the reflecting electrodes 126 and the transparent electrodes 227a and 227b are formed, and the protrusions 211a to 211c are formed by use of a photoresist, the vertical orientation film 128 is formed by use of a vertical orientation film material of a photolytic reaction type (manufactured by JSR Corp.). Thereafter, an ultraviolet ray is irradiated from a predetermined direction on the back side (the plane side opposite to the plane on which the orientation film 128 is formed), and the vertical orientation film 128 in the transmission region is subjected to the pretilt direction determination processing.

Moreover, on the glass substrate to be the base of the counter substrate, the black matrix 132, the color filter 133, the transparent resin film 134, the common electrode 135, and the protrusions 231 are formed. The color filter 133 is formed to have a thickness of 1.3 µm, and the circular openings 133a having an area equivalent to about 25% of the reflection region are formed in the reflection region. On the common electrode 135, the vertical orientation film 136 is formed by use of the vertical orientation film material of the photolytic reaction type (manufactured by JSR Corp.).

Next, an ultraviolet ray is irradiated from a predetermined direction on the surface side (the plane side on which the orientation film 136 is formed), and the entire orientation film 136 is subjected to the pretilt direction determination processing.

After the TFT substrate and the counter substrate are fabricated as described above, the TFT substrate and the counter substrate are attached to each other by use of a sealing material. Thereafter, liquid crystal of negative dielectric anisotropy (manufactured by Chisso Corporation) is sealed between the substrates, thus obtaining a liquid crystal panel. Subsequently, polarizing plates (manufactured by Sumitomo Chemical Co., Ltd.) and optical compensation films (manufactured by Fuji Photo Film Co., Ltd.) are attached to both sides of the liquid crystal panel. Furthermore, a backlight unit is attached to the liquid crystal panel. Thus, the liquid crystal display device of Application Example 2 is manufactured.

Meanwhile, the liquid crystal display device of Comparative Example 2 is manufactured by use of a method similar to that of Application Example 2, except that a horizontal orientation film material (manufactured by JSR Corp.) is used as the orientation film material, and liquid crystal of positive dielectric anisotropy (manufactured by Merck Ltd.) is used as the liquid crystal.

As to the semi-transmissive liquid crystal display devices of Application Example 2 and Comparative Example 2 and the above-described semi-transmissive liquid crystal display devices of Application Example 1 and Comparative Example 1 in the first embodiment, viewing angle characteristics are measured. Specifically, a field of view range in which a contrast comes to be 2 or more is measured in directions of 0°, 90°, 180° and 270°. In the semi-transmissive liquid crystal display device of Application Example 1, the field of view range in the reflective mode is about 100°, and the field of view range in the transmissive mode is about 100°. In the liquid crystal display device of Comparative Example 1, the field of view range in the reflective mode is about 80°, and the field of view range in the transmissive mode is about 60°. Moreover, in the liquid crystal display device of Application Example 2, the field of view range in the reflective mode is about 120°, and the field of view range in the transmissive mode is about 160°. In the liquid crystal display device of Comparative Example 2, the field of view range in the reflective mode is about 100°, and the field of view range in the transmissive mode is about 120°.

From the above results, it is confirmed that the multi-domain liquid crystal display device shown in the second embodiment has better viewing angle characteristics than the single-domain liquid crystal display device shown in the first embodiment.

What is claimed is:

1. A semi-transmissive liquid crystal display device, which is formed by sealing liquid crystal of negative dielectric anisotropy between first and second substrates and has a transmission region controlling transmitted light and a reflection region controlling reflected light, comprising:
    a transparent electrode disposed in the transmission region of the first substrate;
    a reflecting electrode disposed in the reflection region of the first substrate;
    a first vertical orientation film covering surfaces of the transparent electrode and the reflecting electrode;
    a common electrode which is formed on the second substrate and faces the transparent electrode and the reflecting electrode; and
    a second vertical orientation film covering a surface of the common electrode,
    wherein only the second vertical orientation film and the first vertical orientation film on the transparent electrode are modified by light,
    and further wherein a pretilt angle of liquid crystal molecules on an interface of the first vertical orientation film on the transparent electrode, a pretilt angle of liquid crystal molecules on an interface of the second vertical orientation film in a region opposed to the transparent electrode and a pretilt angle of liquid crystal molecules on an interface of the second vertical orientation film in a region opposed to the reflecting electrode are 45° or more, and are smaller than a pretilt angle of liquid crystal molecules on an interface of the first vertical orientation film on the reflecting electrode, and the liquid crystal molecules in the transmission region are subjected to bend orientation.

2. The semi-transmissive liquid crystal display device according to claim 1, wherein the first and second vertical orientation films are formed by use of an orientation film material of a photolytic reaction type.

3. The semi-transmissive liquid crystal display device according to claim 1, wherein a liquid crystal layer in the reflection region is set to be thinner than that in the transmission region.

4. The semi-transmissive liquid crystal display device according to claim 1, wherein thickness of a liquid crystal layer in the reflection region is set to be about ½ of thickness of the liquid crystal layer in the transmission region.

5. The semi-transmissive liquid crystal display device according to claim 4, wherein a gap between the first and second substrates is maintained by protrusions formed in the reflection region.

6. The semi-transmissive liquid crystal display device according to claim 1, wherein liquid crystal orientation in the reflection region coincides with liquid crystal orientation in the transmission region when the reflecting electrode is used as an axis of symmetry.

7. The semi-transmissive liquid crystal display device according to claim 1, wherein slits which determine an orientation direction of liquid crystal molecules are provided in edges of the transparent electrode.

8. The semi-transmissive liquid crystal display device according to claim 1, wherein a pretilt direction of liquid crystal molecules on a surface of the first vertical orientation film on the transparent electrode is the same as a pretilt direction of liquid crystal molecules on a surface of the second vertical orientation film in the region opposed to the transparent electrode, and the pretilt direction of liquid crystal molecules on the surface of the first vertical orientation film on the transparent electrode is the same as a pretilt direction of liquid crystal molecules on a surface of the second vertical orientation film in the region opposed to the reflecting electrode.

9. The semi-transmissive liquid crystal display device according to claim 1, wherein, in the transmission region and the reflection region, a plurality of regions are provided, in which pretilt directions of liquid crystal molecules are different from each other.

10. The semi-transmissive liquid crystal display device according to claim 1, wherein the reflecting electrode and the transparent electrode are electrically connected to the same thin film transistor.

11. The semi-transmissive liquid crystal display device according to claim 1, wherein, on the second substrate, a color filter is formed, which has openings in part of a region facing the reflecting electrode.

12. The semi-transmissive liquid crystal display device according to claim 1, wherein a difference between the pretilt angle of liquid crystal molecules on the interface of the first vertical orientation film on the reflecting electrode and the pretilt angle of liquid crystal molecules on the interface of the second vertical orientation film in the region opposed to the transparent electrode is 45° or less, and a difference between the pretilt angle of liquid crystal molecules on the interface of the first vertical orientation film on the reflecting electrode and the pretilt angle of liquid crystal molecules on the interface of the second vertical orientation film in the region opposed to the reflecting electrode is 45° or less.

* * * * *